United States Patent
Persson et al.

(10) Patent No.: US 10,148,963 B2
(45) Date of Patent: Dec. 4, 2018

(54) METHODS OF AND APPARATUS FOR ENCODING DATA ARRAYS

(71) Applicant: ARM Limited, Cambridge (GB)

(72) Inventors: Erik Persson, Lund (SE); Fredrik Peter Stolt, Lund (SE)

(73) Assignee: Arm Limited, Cambridge (GB)

( * ) Notice: Subject to any disclaimer, the term of this patent is extended or adjusted under 35 U.S.C. 154(b) by 140 days.

(21) Appl. No.: 15/274,044

(22) Filed: Sep. 23, 2016

(65) Prior Publication Data

US 2018/0091818 A1    Mar. 29, 2018

(51) Int. Cl.
| | |
|---|---|
| H04N 7/12 | (2006.01) |
| H04N 11/02 | (2006.01) |
| H04N 11/04 | (2006.01) |
| H04N 19/137 | (2014.01) |
| H04N 19/105 | (2014.01) |
| H04N 19/513 | (2014.01) |
| H04N 19/86 | (2014.01) |
| H04N 19/59 | (2014.01) |
| H04N 19/172 | (2014.01) |
| H04N 19/176 | (2014.01) |
| H04N 19/182 | (2014.01) |

(52) U.S. Cl.
CPC ......... *H04N 19/137* (2014.11); *H04N 19/105* (2014.11); *H04N 19/513* (2014.11); *H04N 19/59* (2014.11); *H04N 19/86* (2014.11); *H04N 19/172* (2014.11); *H04N 19/176* (2014.11); *H04N 19/182* (2014.11)

(58) Field of Classification Search
CPC .... H04N 19/137; H04N 19/86; H04N 19/513; H04N 19/105; H04N 19/59; H04N 19/182; H04N 19/176; H04N 19/172
USPC ..................................................... 375/240.15
See application file for complete search history.

(56) References Cited

U.S. PATENT DOCUMENTS

| | | | |
|---|---|---|---|
| 2015/0264390 A1* | 9/2015 | Laroche | H04N 19/105 375/240.16 |
| 2016/0021385 A1* | 1/2016 | Chou | H04N 19/513 375/240.16 |

* cited by examiner

*Primary Examiner* — Jared Walker
(74) *Attorney, Agent, or Firm* — Vierra Magen Marcus LLP

(57) ABSTRACT

To perform motion estimation for a video frame block to be encoded, a difference measure is determined for each of a plurality of reference frame block positions at a first, coarser resolution. The determined difference measures are then used estimate difference measures for reference frame blocks at positions at a second resolution that is finer than the first resolution. The estimated second, finer position resolution difference measures are then used to select a set of reference frame block positions for which to determine "full" difference measures. The determined "full" difference measures for each of the selected reference frame block positions are then used to select the reference frame block position to use when encoding the frame block and a motion vector corresponding to that reference frame block position is associated with and encoded for the frame block being encoded.

20 Claims, 5 Drawing Sheets

METHODS OF AND APPARATUS FOR ENCODING DATA ARRAYS

BACKGROUND

The technology described herein relates to methods of and apparatus for encoding data arrays, and in particular to methods of and apparatus for performing motion estimation when performing video encoding.

Video image data is typically generated as a sequence of frames, each frame comprising an array of pixels (data positions). In "differential" video coding standards such as MPEG and VP9, frames in a sequence of frames to be encoded (which can be thought of as "source" frames to be encoded) are usually encoded with reference to another, e.g. previous, frame or frames of the sequence of frames to be encoded (which other frame or frames can accordingly be thought of as a "reference" frame(s) for the (source) frame being encoded). This is usually done by dividing a source frame into a plurality of blocks of pixels and encoding (and subsequently decoding) each block with respect to a reference block (or blocks) from a reference frame (or frames).

Each pixel block for a source frame that has been differentially encoded is usually defined by a vector value (the so-called "motion vector") pointing to the reference frame block in the reference frame and data (the "residual") describing the differences between the data in the source (i.e. current) frame block and the reference frame block. (This thereby allows the video data for the block of the source frame to be constructed from the reference frame video data pointed to by the motion vector and the difference data describing the differences between that reference frame block and the block of the source frame.)

An important aspect of such differential encoding of video data is identifying which area of the video frame being used as a reference frame for the encoding process is most (or at least sufficiently) similar to the source frame block being encoded (such that there is then a reduced or minimum number of differences to be encoded). This is complicated by the fact that, typically, the area of the reference frame that most closely matches a given block in a current frame being encoded will not be in the same position within the reference frame as it is in the current frame, e.g. because objects and/or the camera position move between frames.

Differential encoding of video data typically therefore involves firstly identifying the position in the intended reference video frame of the block in that frame that most closely matches the block of the video frame currently being encoded.

The process of identifying the block position in a reference frame to use when differentially encoding a block in a video frame being encoded is usually referred to as "motion estimation". This process is usually carried out by comparing the video data values (usually luminance values) for the block being encoded with a plurality of corresponding-sized blocks each having a different position in the reference video frame until the closest (or a sufficiently close) match in terms of the relevant video data values is found. The relative match between the blocks being compared is assessed using a suitable difference (error) measure, such as a sum of absolute differences (SAD) function. The vector pointing to the so-identified block position in the reference frame is then used as the "motion vector" for the block being encoded.

Because this motion estimation operation to find the motion vector to be used for encoding a block of a video frame is done, in effect, by calculating a lot of correlations between the block to be encoded and different offsets into the reference frame, it is one of the most computationally heavy operations that is performed when encoding video data. This may be exacerbated in arrangements where motion vectors can be tested for and determined at resolutions smaller than a whole pixel, such as quarter pixel or one eighth pixel resolution. In that case, in order to determine the difference measure when considering block positions in the reference frame that are not aligned with integer pixel positions, it is necessary to determine data values for reference frame positions that do not align with pixel positions in the reference frame (e.g. that are intermediate the reference frame pixels). This is usually done by interpolation from the (known) pixel data values. This can be a very computationally intensive operation.

To reduce the amount of computation that is required for this process, it is known therefore to initially assess potential candidate blocks in the reference frame for use when encoding a block of a video frame at a coarser resolution (e.g. at integer pixel positions), and to use the results of that assessment to identify a smaller region of the reference frame to then assess at a finer resolution (e.g. at a sub-pixel resolution), and so on, if desired, so as to gradually spiral down to finer and finer resolutions until a motion vector for the desired finest resolution (e.g. at a quarter pixel resolution) has been determined.

The Applicants believe that there remains scope for improved techniques for performing the motion estimation operation used for video encoding.

BRIEF DESCRIPTION OF THE DRAWINGS

A number of embodiments of the technology described herein will now be described by way of example only and with reference to the accompanying drawings, in which.

Like reference numerals are used for like features throughout the drawings, where appropriate.

DETAILED DESCRIPTION

Figure 1:
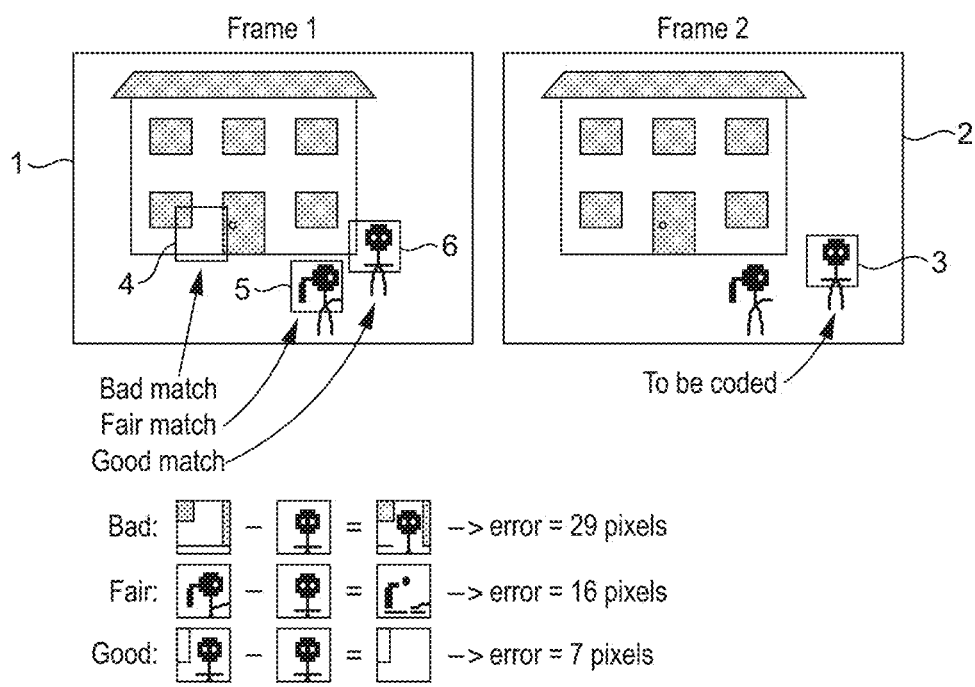
FIG. 1 shows schematically the motion estimation process for video encoding.

A first embodiment of the technology described herein comprises a method of determining a motion vector for use when encoding a block of a frame of video data to be encoded, the method comprising:

for a block of a video frame being encoded:

for each of a plurality of different block positions in a reference video frame that the block being encoded is to be differentially encoded with respect to, the block positions being distributed at a first, coarser position resolution across the reference frame, determining a difference measure for the block being encoded with respect to a corresponding block of the reference frame having the block position in question;

using the determined difference measures at the first, coarser position resolution to estimate for each of a plurality of different block positions distributed across the reference frame at a second position resolution that is finer than the first, coarser resolution, a difference measure for the block being encoded with respect to a corresponding block of the reference frame having the block position in question;

using the estimated difference measures for the block positions at the second, finer resolution to select a set of at least one block position in the reference frame for which to determine a difference measure for the block being encoded;

for each position of the selected set of at least one block position, determining a difference measure for the block being encoded with respect to a corresponding block of the reference frame having the block position in question;

selecting the block position in the reference frame to use when encoding the block being encoded based on the determined difference measures for each block position of the selected set of at least one block position; and determining a motion vector to use for the block being encoded based on the selected block position.

A second embodiment of the technology described herein comprises an apparatus for determining a motion vector for use when encoding a block of a frame of video data to be encoded, the apparatus comprising:

difference measure determining circuitry configured to determine, for a block of a video frame being encoded, for each of a plurality of different block positions in a reference video frame that the block being encoded is to be differentially encoded with respect to, the block positions being distributed at a first, coarser position resolution across the reference frame, a difference measure for the block being encoded with respect to a corresponding block of the reference frame having the block position in question;

difference measure estimating circuitry configured to use the determined difference measures at the first, coarser position resolution to estimate for each of a plurality of different block positions distributed across the reference frame at a second position resolution that is finer than the first, coarser resolution, a difference measure for the block being encoded with respect to a corresponding block of the reference frame having the block position in question;

block position selection circuitry configured to use the estimated difference measures for the block positions at the second, finer resolution to identify a set of at least one block position in the reference frame for which to determine a difference measure for the block being encoded;

difference measure determining circuitry configured to determine, for each position of the selected set of at least one block position, a difference measure for the block being encoded with respect to a corresponding block of the reference frame having the block position in question;

selection circuitry configured to select the block position in the reference frame to use when encoding the block being encoded based on the determined difference measures for each block position of the selected set of at least one block position; and motion vector determining circuitry configured to determine a motion vector to use for the block being encoded based on the selected block position.

The technology described herein relates to the process for determining a motion vector when performing motion estimation when performing video encoding.

In the technology described herein a set of difference measures for a plurality of different block positions in a reference frame at a first, coarser resolution (e.g. at a pixel resolution) are determined for a block of a video frame to be encoded. However, rather than then immediately determining difference measures for reference frame blocks at a finer position resolution (e.g. at a half pixel resolution), instead difference measures for block positions at a finer resolution (e.g. at a quarter pixel resolution) are estimated using the difference measures that were determined at the coarser (e.g. pixel) resolution. The estimated difference measures are then used to select (identify) a set of block positions in the reference frame for which to determine difference measures, and the determined difference measures for that set of identified block positions are then used to select the block position (the motion vector) to use when encoding the block of the frame to be encoded.

As will be discussed further below, the technology described herein allows the number of finer resolution block positions (e.g. sub-pixel positions) that full determinations of the difference measure (e.g. the sum of the absolute differences) are determined for to be reduced, as compared, e.g., to existing arrangements. In particular, the Applicants have recognised that it is possible to use the difference measures determined at the coarser resolution to estimate difference measures at a finer resolution, and that those estimates can then be used to select a reduced set of finer resolution block positions at which to then fully determine a difference measure between the reference frame block and the block being encoded, thereby allowing the number of non-pixel aligned block positions at which a full determination of the difference measure (and accordingly a full interpolation of the pixel values for the block) is performed to be reduced. This can then significantly reduce the computational burden when performing the motion estimation operation.

Moreover, the Applicants have recognised that using such estimates can still allow the appropriate reference frame block position to be satisfactorily, and sufficiently accurately, identified, such that the quality of the motion estimation operation is not undesirably adversely affected as compared, e.g., to arrangements in which full difference measures are determined for a larger set of non-pixel aligned block positions.

The block of the video frame to be encoded can comprise any suitable and desired (two-dimensional) block of pixels (data positions) within the video frame, such as a 16×16, 32×32 or 64×64 block of pixels. This may depend, e.g., upon the video encoding process (e.g. standard) being used. In general, the blocks of the video frames that are being considered can be any suitable and desired size and shape (in terms of the pixel (data) positions that they encompass). The blocks are in an embodiment rectangular and in an embodiment square.

In an embodiment, the video frame being encoded is divided into plural blocks for encoding purposes, and the operation in the manner of the technology described herein is in an embodiment performed to determine the motion vector to use for encoding for plural of the blocks, and in an embodiment for each block, that the video frame to be encoded has been divided into for encoding purposes. Where a video frame is divided into plural blocks for encoding purposes, then each block may be of the same configuration (size and shape) or, e.g. depending upon the encoding process being used, the blocks may be of different sizes and/or shapes.

The operation in the manner of the technology described herein is correspondingly in an embodiment repeated for plural frames of a sequence of video frames to be encoded, e.g., and in an embodiment, for each frame that is to be differentially encoded in a sequence of video frames to be encoded.

The reference video frame that the video frame being encoded is to be differentially encoded with respect to can be any suitable and desired video frame. It is in an embodiment a frame of (or at least based on a frame of) the overall sequence of video frames that is being encoded. The reference frame may be the frame that the block being encoded belongs to (in an "intra" encoding mode) but is in an embodiment a different (another) frame of the sequence (in an "inter" encoding mode). In the latter case, the reference frame may be before or after the frame being encoded in the sequence of frames as they will be displayed. The reference frame may be derived only from one other frame, or it may be derived from plural other frames, such as both a previous and a subsequent frame.

Each block of the reference frame that a difference measure for the block being encoded is determined or estimated for should correspond to the block of the frame being encoded in terms of its size and shape (i.e. in terms of the number of data positions and the configuration of those data positions). Thus, for example, where the block of the frame being encoded comprises a 16×16 pixel block, each reference frame block that a difference measure is determined or estimated for should equally comprise 16×16 data positions in the reference frame.

Where the reference frame block being considered is aligned with integer pixel positions in the reference frame, then the reference frame block will comprise a block of pixels corresponding to the block being encoded. Where the position of the reference frame block being considered is offset from (is not aligned with) integer pixel positions in the reference frame (e.g. is aligned at a quarter or a half pixel positions in the reference frame), then the reference frame block will comprise an array of data positions corresponding to the size and layout of the block being encoded in terms of its pixel positions but with each data position in the reference frame block being positioned at the appropriate, offset (non-pixel aligned) position in the reference frame.

The difference measure that is determined as a measure of the difference (error) between the video frame block being encoded and a respective reference frame block can be any suitable and desired measure that is representative of the differences (error) between the two blocks.

In an embodiment, respective data values for corresponding pairs of positions in the block being encoded and the reference frame block are compared. Thus the data value for a pixel position in the block being encoded is in an embodiment compared to the data value for the corresponding position in the reference frame block. In an embodiment the difference between the two data values is determined, in an embodiment for each pixel position in the block being encoded.

In an embodiment, the difference measure that is used is the sum of absolute differences (SAD) between the block being encoded and the reference frame block (i.e. the sum of the absolute differences between the value of each pixel in the block being encoded and the data value for the corresponding data position in the reference frame block). Other difference measures, such as a mean absolute difference (MAD) and/or a mean squared difference (MSD), could be used, if desired. This may, e.g., depend upon the video encoding technique (e.g. standard) that is being used.

The actual data values that are compared (whose differences are determined) will, and in an embodiment do, depend upon the format of the video data being encoded. Where the video data to be encoded is provided as luminance (Y) and chrominance (U, V) values for the pixels in the video frame, then in an embodiment the luminance values are compared (the differences between the luminance values are determined) but the chrominance values could also or instead be considered, if desired.

Where a data value for a position in the reference frame that is not aligned with the reference frame pixel positions (e.g. for a sub-pixel position) is required for the purposes of determining a difference measure, then in an embodiment such data values are determined by appropriate interpolation from the known data values (pixel values) at the pixel positions in the reference frame. Such interpolation can use any suitable and desired interpolation process, e.g. as is required or defined by the video encoding process (standard) being used. In an embodiment, such data values are determined by using bilinear interpolation from the (known) pixel position values, although other arrangements, such as using up to eight-tap interpolation filters, could be used if desired.

The first, coarser position resolution for which respective different measures are determined may be any suitable and desired resolution at which to determine the difference measures.

In an embodiment, the first, coarser resolution is a resolution of integer pixel positions, i.e. is for reference frame block positions that are aligned with pixel positions in the reference frame (and that are offset from each other by an integer number of pixel positions in the reference frame). In an embodiment, the first, coarser resolution is at the resolution of one pixel, i.e. such that each reference frame block for which the difference measure is determined is aligned with (integer) pixel positions in the reference frame and is offset from its immediately adjacent reference frame blocks by one pixel position (in the direction in question).

While it would be possible to determine a difference measure for each block position in the first, coarser position resolution across the entire reference frame, in an embodiment, difference measures are only determined for block positions within a particular, in an embodiment selected, region of the reference frame (i.e. for some but not all of the block positions at the first, coarser position resolution across the entire reference frame). The region of the reference frame for which determined difference measures for block positions at the first, coarser position resolution are determined may be determined and selected as desired, e.g., and in an embodiment, based upon the position of the block being encoded within its video frame (such that, e.g., difference measures are determined for block positions in the region of the reference frame that corresponds to the location of the block being encoded in the frame to be encoded).

Correspondingly, the number of different block positions in the reference video frame that a difference measure is determined for in an embodiment comprises some but not all of the block positions in the first, coarser position resolution across the entire reference frame.

Once difference measures have been determined for the plurality of different block positions at the first, coarser position resolution, then those determined difference measures are used to estimate difference measures for each of a plurality of different block positions distributed across the reference frame at a second resolution that is finer than the first, coarser resolution.

The second, finer position resolution at which the difference measures are estimated may be any suitable and desired resolution of reference frame block positions that is a finer resolution than the first, coarser resolution. In an embodiment, the second, finer resolution is for reference frame block positions at a sub-pixel (some fraction of a pixel) resolution, e.g. for reference frame block positions at a quarter pixel or one eighth pixel resolution (aligned with quarter pixel and/or one eighth pixel positions in the reference frame). In an embodiment the second, finer resolution is a quarter pixel resolution (i.e. such that each reference frame block at that resolution is aligned with a quarter pixel position in the reference frame and is offset from its immediately adjacent reference frame block by one quarter of a pixel (in the direction in question)).

Other arrangements would, of course, be possible, and may depend, e.g., upon what resolution the first, coarser resolution is.

It would also be possible, if desired, to perform the operation in the manner of the technology described herein for successive layers of resolution within the same block encoding process, e.g. where the encoding process considers plural different levels of progressively finer resolution in order to determine the motion vector to use for a block to be encoded.

While it would be possible to estimate a difference measure for each block position in the second, finer position resolution across the entire reference frame, in an embodiment, difference measures are only estimated for block positions within a particular, in an embodiment selected, region of the reference frame (i.e. for some but not all of the block positions at the second, finer position resolution across the entire reference frame).

Correspondingly, the number of different block positions in the reference video frame that a difference measure is estimated for in an embodiment comprises some but not all of the block positions in the second, finer position resolution across the entire reference frame.

The region of the reference frame at which difference measures for block positions at the second, finer position resolution are estimated may be determined and selected as desired. It is in an embodiment selected based upon the determined difference measures for the block positions in the reference frame at the first, coarser resolution.

In an embodiment, the difference measures determined at the first, coarser position resolution are used to select a set of at least one (and in an embodiment of plural) of those block positions at the first, coarser position resolution to be subjected to further processing, and in particular to be used to estimate difference measures for each of a plurality of different block positions distributed across the reference frame at the second, finer position resolution.

In an embodiment difference measure estimates are determined for reference frame block positions at the second, finer resolution for reference frame block positions at that second, finer resolution that fall between the block positions at the first, coarser position resolution that have been identified for further processing.

Thus, once a set of reference frame block positions at the first resolution which are to be considered further have been determined, then difference measures for a set of reference frame block positions intermediate the selected reference frame positions at the first resolution are in an embodiment estimated, in an embodiment using the determined difference measures for the selected reference frame positions at the first resolution.

The set of reference frame block positions at the first, coarser resolution that are identified (selected) for processing further can comprise any suitable and desired set of reference frame block positions.

In an embodiment, the set of reference frame block positions for processing further is selected (identified) based on determined cost measures for the reference frame block positions at the first, coarser resolution, which cost measure is representative of the "cost" of using a reference frame block position as the reference frame block position when encoding the block being encoded.

The cost measure for a given reference frame block position should be, and is in an embodiment, based at least in part on the determined difference measure (e.g. SAD) for the block position. The cost measure may comprise solely (be based solely on) the determined difference measure, but in an embodiment also takes account of one or more other encoding "cost" parameters (factors). In an embodiment, the cost measure also includes (is based on) the cost of coding the motion vector that corresponds to the block position in question (in the video encoding scheme being used). The cost of coding the motion vector is in an embodiment represented as the number of bits that would be needed to encode the motion vector, in an embodiment weighted by a factor that represents the desired (selected) coding quality (e.g. and in an embodiment in terms of how much the residuals (differences) are to be quantised).

In an embodiment, the set of reference frame block positions that is identified comprises the reference block position that has the minimum determined cost measure, together with one or more, and in an embodiment plural, reference block positions surrounding that minimum cost measure position. In an embodiment, a set of at least (and in an embodiment of only) nine reference frame block positions is selected, comprising the reference block position having the minimum determined cost measure and its surrounding eight reference block positions.

Correspondingly, in an embodiment, the region of the reference frame at which difference measures for block positions at the second, finer position resolution are estimated is a region of the reference frame that includes the reference block position at the first, coarser resolution having a particular, in an embodiment selected, and in an embodiment the minimum (smallest), determined cost measure.

A difference measure for a reference frame block position at the second resolution can be estimated using determined difference measures for block positions at the first, coarser position resolution in any suitable and desired manner. In an embodiment, a set of plural (e.g. and in an embodiment at least three (and in an embodiment only three) difference measures at the first, coarser position resolution is used to estimate a given difference measure for a block position at the second, finer resolution.

In an embodiment, a set of (at least) three adjacent (in position) determined difference measures is selected, with the central position of the three having the minimum determined difference measure, and then that set of determined difference measures is used to estimate difference measures for reference frame block positions that are intermediate (in between) the reference frame block positions that the set of (at least) three adjacent (in position) determined difference measures corresponds to.

In an embodiment, the estimation is done by fitting a function to a (to the) set of plural determined reference frame difference measures for the first, coarser resolution, and then using that function to generate estimates for the difference measure for reference frame block positions at the second, finer resolution that are intermediate (in between) the reference frame block positions that are being considered.

In an embodiment, this is done by considering respective axis directions across the video frame in turn. In an embodiment, estimated values are determined in one axis direction (e.g. the horizontal, x, direction), first, and then those estimated difference measures are used, together with determined difference measures, to generate a set of estimated difference measures in the other (e.g. vertical, y) axis direction.

While it would in these arrangements be possible to estimate difference measures for each intermediate (sub-pixel) position at the second, finer resolution, in between the reference frame block positions that are being considered, in an embodiment difference measures are estimated for only some but not all of the intermediate positions at the second, finer resolution. In an embodiment difference measures are estimated for intermediate positions in the reference frame at the second, finer resolution that are closer to the reference frame position having the minimum (smallest) determined cost measure at the first, coarser resolution, and difference measures are not estimated for at least some of the intermediate positions at the second, finer resolution that are further from the reference frame block position at the first, coarser resolution that has the minimum determined cost measure.

In the case where a set of nine reference block positions at the first, coarser position resolution are selected, comprising the reference block position having the minimum determined cost measure and its surrounding eight reference block positions, then in an embodiment three functions are fitted in one direction (e.g. the horizontal direction) to estimate difference measure values for intermediate (e.g. sub-pixel) positions along that direction, and then five functions are fitted in the other (e.g. vertical) direction to estimate further difference measures for intermediate (sub-pixel) positions along that direction. In an embodiment difference measures are estimated for twenty four intermediate (sub-pixel) positions.

In an embodiment the difference measures for the reference frame block positions at the second, finer resolution are estimated by fitting a second degree polynomial to plural, e.g., and in an embodiment, three, reference block position difference measures at the first, coarser resolution. In this case only adjacent values are needed to be able to fit the polynomial, and such a polynomial should produce a minimum if the centre value of three determined difference values that are being considered is the smallest.

Once difference measures for the (selected) reference frame block positions at the second, finer resolution have been estimated, then those estimated difference measures are used to select a set of at least one block position in the reference frame for which to determine a difference measure for the block being encoded. In an embodiment a set of at least one block position at the second, finer resolution (or at a resolution that is even finer than the second, finer resolution) is selected. In an embodiment a set of plural block positions in the reference frame for which to determine a difference measure for the block being encoded is selected. In an embodiment, a set of 2×2 block positions in the reference frame for which determine a difference measure for the block being encoded is selected.

The selection is in an embodiment based on the estimated difference measures for the block positions at the second, finer resolution.

In an embodiment, the selection is based on determined cost measures for the block positions at the second, finer resolution, which cost measures are in an embodiment of the form discussed above. Thus, in an embodiment, the set of reference frame block positions for which to determine a difference measure for the block being encoded is selected (identified) based on determined cost measures for the reference frame block positions at the second, finer resolution, with the cost measure for a reference frame block position in an embodiment being based at least in part on the estimate difference measure (e.g. SAD) for the block position, and, in an embodiment, also being based on a cost of coding the motion vector that corresponds to the block position in question (as discussed above).

In an embodiment the block position from the block positions at the first, coarser position resolution for which difference measures have been determined and the block positions at the second, finer resolution for which difference measures have been estimated having the smallest (minimum) determined cost measure is identified and selected to be included in the set of at least one block position in the reference frame for which to determine a difference measure for the block being encoded. Thus, in an embodiment, the estimated difference measures for the block positions at the second, finer resolution are used together with the determined difference measures at the first, coarser position resolution to select a set of at least one block position in the reference frame for which to determine a difference measure for the block being encoded.

In an embodiment the selected set of at least one block position in the reference frame for which to determine a difference measure for the block being encoded comprises the block position in the reference frame having the smallest determined cost measure, together with one or more, and in an embodiment plural, block positions at the second, finer resolution (or at a resolution that is finer than the second resolution) that are adjacent to that block position having the minimum determined cost measure.

While it would be possible to include all the (immediately) adjacent block positions at the resolution in question in the set of at least one block position of the reference frame for which to determine a difference measure for the block being encoded, in an embodiment only some but not all of those adjacent block positions are included in the set.

In an embodiment this is done by determining which adjacent block position at the resolution in question will lie on the other side of the minima in the difference measure relative to the block position having the smallest determined cost measure in each axis direction, and then selecting a 2×2 set of block positions for which to determine a difference measure for the block being encoded based on that determination (i.e. such that a 2×2 set of block positions that should surround the minimum cost measure across the reference frame is selected).

The position in the relevant axis direction that lies on the other side of minima in the difference measure across the reference frame in that axis direction can be determined as desired. This is in an embodiment done using the difference function that was fitted to the determined difference measures for block positions at the first, coarser position resolution that was used to estimate the difference measures for block positions at the second, finer resolution.

Where a second degree polynomial was used to estimate the difference measures at the second, finer position resolution, then in an embodiment, the derivative of the polynomial in question is used to determine which direction along the respective axis the position adjacent the position having the minimum cost measure that is to be used should be taken from.

Once a selected set of at least one block position (e.g. a 2×2 set of block positions) for which to determine a difference measure for the block being encoded has been determined, then a difference measure is determined for the block being encoded with respect to corresponding blocks of the reference frame having each block position in question. This determination can be, and is in an embodiment, done in a similar manner to the determination for the difference measures for reference frame block positions at the first, coarser position resolution across the reference frame.

Where a difference measure has already been determined for a block position in the selected set of at least one block position (e.g. because one of the block positions in the set corresponds to a block position at the first, coarser position resolution for which a difference measure has already been determined), then the previously determined difference measure can be reused at this stage, rather than re-determining a difference measure for that reference frame block position, if desired.

Once a difference measure has been determined for each position of the selected set of at least one block position (whether by reusing an existing determination of the difference measure for a block position(s) or by determining a difference measure for the block position(s)), then the block position in the reference frame to use when encoding the block being encoded is selected based on those determined difference measures. This can be done in any suitable and desired manner.

In an embodiment, the selection is based on determined cost measures for the block positions in the selected set of at least one block position, which cost measures are in an embodiment of the form discussed above. Thus, in an embodiment, the reference frame block position to use when encoding the block being encoded is selected (identified) based on determined cost measures for the reference frame block positions in the selected set of at least one block position, with the cost measure for a reference frame block position in an embodiment being based at least in part on the estimated/determined difference measure (e.g. SAD) for the block position, and, in an embodiment, also being based on a cost of coding the motion vector that corresponds to the block position in question (as discussed above).

In an embodiment the block position having the minimum (smallest) determined cost measure is identified and selected as a block position in the reference frame to use when encoding the block being encoded.

The motion vector to use for the block being encoded is then determined based on the selected block position. This can be done in any suitable and desired manner, e.g. in accordance with the video encoding process (e.g. standard) being used.

Once the motion vector to use for the block being encoded has been determined, then the block being encoded can be, and is in an embodiment, encoded in the appropriate manner. This may comprise subjecting the block to any desired and suitable further encoding processes, e.g., in dependence upon the video encoding process (e.g. standard) being used.

Thus, the further encoding of the block being encoded may comprise, and in an embodiment does comprise one or more of, and in an embodiment all of: generating a set of difference values that represents the difference between the block being encoded and the reference frame block indicated by the determined motion vector for the block being encoded (e.g. by subtracting the values of the pixels of the block being encoded respectively from the values for the corresponding positions in the reference frame block, or vice versa) (this may also include first applying motion compensation to the determined reference frame block before determining the set of difference values); generating a set of frequency domain coefficients for the set of difference values, e.g., and in an embodiment by applying a (e.g., and in an embodiment, complete) forward transformation process, such as a discrete cosine transformation (DCT), to the set of difference values; generating a set of quantised coefficients by applying a quantisation process to the set of frequency domain coefficients; and (e.g. entropy) encoding the set of (e.g. quantised) coefficients.

Once encoded, the encoded video frame block(s) may be used in any desired and suitable way. They are in an embodiment output, e.g. stored in memory and/or transmitted/streamed to another device. Thus, the apparatus may comprise output circuitry (e.g. write out circuitry) configured to output (e.g. write out) the encoded video frame block(s), e.g. to memory or to another device.

The encoded video frame block(s) may later be retrieved and/or received, e.g. for decoding. Thus, the apparatus may comprise input circuitry (e.g. read in circuitry) configured to input (e.g. read in) the encoded video frame block(s), e.g. from memory, and circuitry (e.g. decoding circuitry) to then decode the encoded blocks, e.g., and in an embodiment, for output, e.g. for display.

The decoding process can take any desired and suitable form, for example that corresponds to the encoding process that was used when encoding the encoded video frame block.

Once decoded, a decoded video frame block may be used in any desired and suitable way. For example, the decoded block may be output (e.g. by an output (e.g. display) processor), e.g. for display.

Although the technology described herein has been described above with particular reference to motion estimation in video encoding, the Applicants believe that the techniques of the technology described herein will be applicable to the comparison of two-dimensional arrays of data, and to differential encoding techniques where comparisons of different data sets is required, more generally.

It could also be used, for example, for 2-dimensional pattern recognition, particularly where a single input pattern is to be compared with plural reference patterns. An example of such an application would be retina pattern matching. Other applications of these embodiments of the technology described herein would be, for example, text recognition (such as recognising and translating from a bitmap representation of text to a character representation of the text), and scanning applications such as detecting actual motion from one frame to the next by combining plural input images of a given target from a moving camera into one image (by determining the differences between each of the images).

Thus, another embodiment of the technology described herein comprises a method of comparing a block of a data array to one or more blocks of another data array, the method comprising:

for a block of a data array to be compared:

for each of a plurality of different block positions in another data array that the block being compared is to be compared to, the block positions being distributed at a first, coarser position resolution across the another data array, determining a difference measure for the block being compared with respect to a corresponding block of the another data array having the block position in question;

using the determined difference measures at the first, coarser position resolution to estimate for each of a plurality of different block positions distributed across the another data array at a second position resolution that is finer than the first, coarser resolution, a difference measure for the block being compared with respect to a corresponding block of the another data array having the block position in question;

using the estimated difference measures for the block positions at the second, finer resolution to select a set of at least one block position in the another data array for which to determine a difference measure for the block being compared; and for each position of the selected set of at least one block position, determining a difference measure for the block being compared with respect to a corresponding block of the another data array having the block position in question.

Another embodiment of the technology described herein comprises an apparatus for comparing a block of a data array with one or blocks of another data array, the apparatus comprising:

difference measure determining circuitry configured to, for a block of a data array to be compared, determine, for each of a plurality of different block positions in another data array that the block being compared is to be compared to, the block positions being distributed at a first, coarser position resolution across the another data array, a difference measure for the block being compared with respect to a corresponding block of the another data array having the block position in question;

difference measure estimating circuitry configured to use the determined difference measures at the first, coarser position resolution to estimate for each of a plurality of different block positions distributed across the another data array at a second position resolution that is finer than the first, coarser resolution, a difference measure for the block being compared with respect to a corresponding block of the another data array having the block position in question;

block position selection circuitry configured to use the estimated difference measures for the block positions at the second, finer resolution to select a set of at least one block position in the another data array for which to determine a difference measure for the block being compared; and difference measure determining circuitry configured to determine, for each position of the selected set of at least one block position, a difference measure for the block being compared with respect to a corresponding block of the another data array having the block position in question.

As will be appreciated by those skilled in the art, these embodiments of the technology described herein can, and in an embodiment do, include any one or more or all of the features of the technology described herein described herein.

The determined difference measures for the selected block positions can be used as desired. For example, and in an embodiment, the block position having the minimum (smallest) difference measure could be identified, and, e.g., taken to be a match for the block being compared, e.g., and in an embodiment, if the difference measure for that block position is less than, or less than or equal to, a particular, in an embodiment selected, threshold value. Correspondingly if the difference measures for each block position of the selected set of block positions are all greater than, or greater than or equal to, a particular, in an embodiment selected, difference measure, then it may, e.g., be concluded that there is no match with the block being compared in the another data array.

The processes described herein in any embodiment may be performed by any desired and suitable apparatus. For example, the processes described herein in any embodiment may be performed by a video processor (codec). The apparatus described herein in any embodiment may therefore comprise or may be a video processor. Thus, the processing circuitry described herein in any embodiment may form part of a video processor. The apparatus described herein in any embodiment may comprise, or may be, or may form part of, a system on chip (SoC).

In an embodiment, the various functions of the technology described herein are carried out on a single data (e.g. video) processing platform.

As will be appreciated by those skilled in the art, the apparatus of the technology described herein may be part of an overall data processing system that includes, for example, a host (e.g. central) processor. The host processor may, for example, execute applications that require video processing by the apparatus. The host processor may send appropriate commands and data to the apparatus to control it to perform the video processing operations and to generate and/or use an output required by applications executing on the host processor. To facilitate this, the host processor may execute a driver for the video processing apparatus.

In embodiments, the apparatus or system may comprise, and/or may be in communication with, one or more memories and/or memory devices that store the data described herein, and/or store software for performing the processes described herein. The apparatus or system may comprise, and/or may be in communication with a display for displaying images based on the data elements of the arrays.

The technology described herein can be implemented in any suitable system, such as a suitably configured computer or micro-processor based system. In an embodiment, the technology described herein is implemented in a computer and/or micro-processor based system.

The various functions of the technology described herein can be carried out in any desired and suitable manner. For example, the steps and functions of the technology described herein can be implemented in hardware or software, as desired. Thus, for example, unless otherwise indicated, the various circuitry, functional elements, stages, and "means" of the technology described herein may comprise a suitable processor or processors, controller or controllers, functional units, circuitry, processing logic, microprocessor arrangements, etc., that are operable to perform the various steps or functions, etc., such as appropriately dedicated hardware elements (processing circuitry) and/or programmable hardware elements (processing circuitry) that can be programmed to operate in the desired manner.

The various steps or functions, etc., of the technology described herein may be duplicated and/or carried out in parallel on a given processor. Equally, the various processing stages may share processing circuitry, etc., if desired.

Subject to any hardware necessary to carry out the specific steps or functions, etc., discussed above, the system can otherwise include any one or more or all of the usual functional units, etc., that data processing apparatus and/or systems include.

The various data processing stages can accordingly be implemented as desired and in any suitable manner, and can perform any desired and suitable functions, respectively. Similarly, the various data can be defined and stored in any suitable and desired manner.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. Thus, further embodiments the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processor. The data processor may be a microprocessor system, a programmable FPGA (field programmable gate array), etc.

The technology described herein also extends to a computer software carrier comprising such software which when used to operate a data processing apparatus or system comprising a data processor causes in conjunction with said data processor said apparatus or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus in further embodiments comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non transitory medium, such as a computer readable medium, for example, diskette, CD, DVD, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

An embodiment of the technology described herein for carrying out the operations necessary for motion estimation in video data compression and encoding will now be described.

A video stream comprises a series of video frames. Each video frame is divided into pixels (picture elements), and in order to be able to display the video frame, video data representing, for example, red, green and blue (RGB) colour values for each pixel in the frame is required. While it would be possible simply to store and handle the video data in RGB format, representing a series of video frames as RGB colour values requires a significant amount of data, and therefore it is known to try to compress the source video data when it is, e.g., encoded for storage and/or transmission, so as to reduce the amount of data that needs to be stored/transmitted. A number of compression techniques are used for this purpose.

Firstly, the red-green-blue (RGB) video data is usually converted to a luminance/chrominance format (e.g. YUV, where Y is luminance (light information) and U, V are chrominance (colour information)). This is done because the human eye is much more sensitive to luminance than to chrominance, and so when the video data is expressed in this format, the chrominance component can be compressed harder than the luminance component. The chrominance data is typically compressed by halving the frame resolution in both directions for the chrominance components (such that when the data is decompressed, the compressed chrominance components are expanded so that each individual chrominance pixel value is used on a 2×2 grid of luminance pixel values).

Each data component of the video frame is then typically block transformed by dividing the video frame into blocks of pixels and transforming each block with a frequency transformation function such as a discrete cosine transformation (DCT). The so-obtained frequency components are then decimated (quantised) and a lossless compression algorithm, such as an entropy encoding algorithm, such as a Huffman algorithm, used on the result. These techniques can be used for video compression because "real world" images tend to have less high-frequency image information than low-frequency image information, and thus the high frequency information can be removed without unduly affecting the reproduced image.

The above steps are basically "image" compression techniques, since they essentially compress the data within an individual video frame without reference to other frames of the video data. However, as discussed above, differential encoding techniques are also used to further compress the video data.

An important aspect of such differential encoding techniques for video compression is so-called "motion estimation", which, as discussed above, is basically the process of identifying closely similar areas in different video frames, such that then differential encoding can be applied as between those frame areas. In the case of MPEG video encoding, for example, motion estimation is typically done on 16×16 pixel luminance macroblocks at a time.

The motion estimation process basically involves searching the same, earlier and/or later, video frames for an area that is closely similar to a block (area) of the video frame currently being compressed. If sufficiently similar frame areas are found, then the data for the block of the current frame is not stored in its "original" form, but instead a so-called "motion vector" pointing to the block (area) in the reference or comparison frame that was found to be similar, together with a compressed representation of the differences between the two blocks in the video frames, is stored. Then, when the video frame is to be decompressed, the motion vector is used to allow the contents of the block in the reference frame pointed to by the motion vector to be copied to the pixel block in the current frame, with the stored differences between the contents of the current frame and the reference frame being pointed to then being applied to that data so as to recreate the pixel data for the current frame.

Thus, in an MPEG video stream, for example, each video frame is subdivided into 16×16 pixel blocks, and for each such pixel block to which motion estimation has been employed, a motion vector pointing to a 16×16 data position block in a reference frame is stored, together with the differences between the contents of the current frame block and the contents of the reference frame block pointed to by the motion vector.

The usual method of determining a motion vector for a pixel block in video encoding is to pick a number of candidate motion vectors, and to then determine for each candidate vector the sum of the accumulated luminance error values that would result from picking that vector for the differential encoding. This process may be reiterated several times, for example picking a new set of candidate motion vectors based on the results of the previous determinations. The process is continued, e.g., for a predetermined number of candidate motion vectors, and the candidate vector giving the smallest accumulated luminance error (thereby indicating the closest match to the current frame block) is then used for the video encoding.

FIG. 1, which shows an exemplary pair of video frames 1, 2, shows a simplified illustration of this process. The luminance values for the pixels in a pixel block 3 of the current video frame 2 that is to be encoded are compared with the luminance values for a plurality of pixel blocks 4, 5, 6 in an earlier video frame 1 that has been selected as the reference video frame for the differential encoding, and the differences (in terms of the number of pixels whose luminance values do not match) between the pixel blocks being compared are determined. As shown in FIG. 1, there is a cumulative error or difference of 29 "non-matching" pixels between blocks 3 and 4, an error value of 16 pixels between blocks 3 and 5, and an error value of 7 pixels between blocks 3 and 6.

In this example, the pixel block 6 in the reference frame 1 would accordingly be selected as the reference pixel block on which to base the differential encoding of the current pixel block 3. A motion vector pointing to that pixel block 6 in the reference frame 1 would then be determined and stored for the pixel block 3 in the video frame 2 being encoded, together with the determined differences between the video data values for the current pixel block 3 and the so-identified reference pixel block 6. The motion vector is determined by subtracting the (x, y) position of a reference point (e.g. the top left-hand corner pixel) in the current pixel block 3 from the (x, y) position of the corresponding reference point in the selected reference pixel block 6, i.e. such that the motion vector represents the differences between the x and y positions of the reference points of the two pixel blocks being compared.

As discussed above, the technology described herein relates to improved techniques for performing the motion estimation operation illustrated by FIG. 1.

Figure 2:
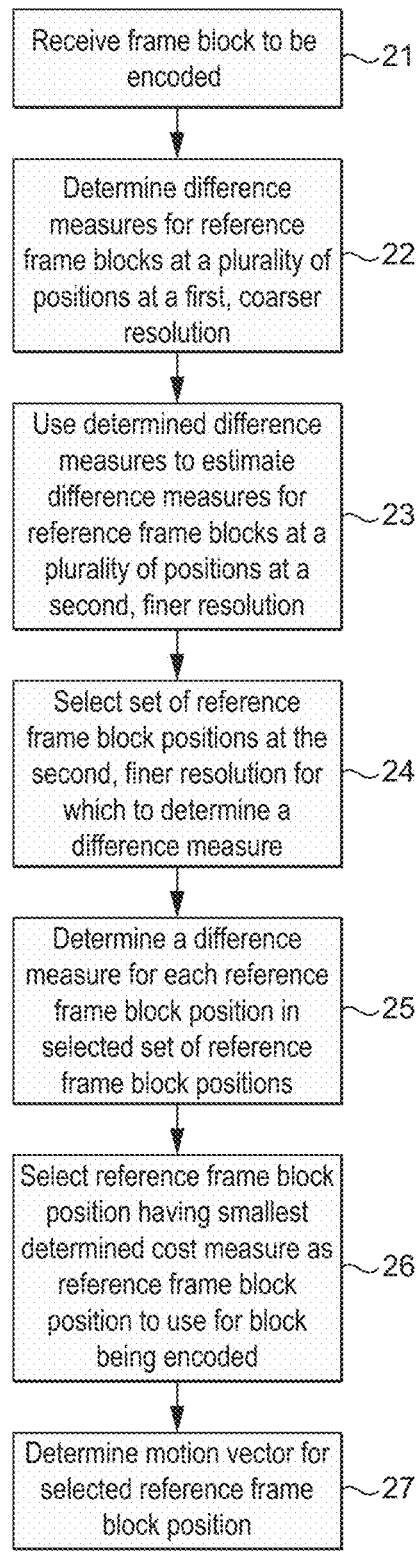
FIG. 2 is a flow chart showing an embodiment of the motion estimation process of the technology described herein.
Figure 3:
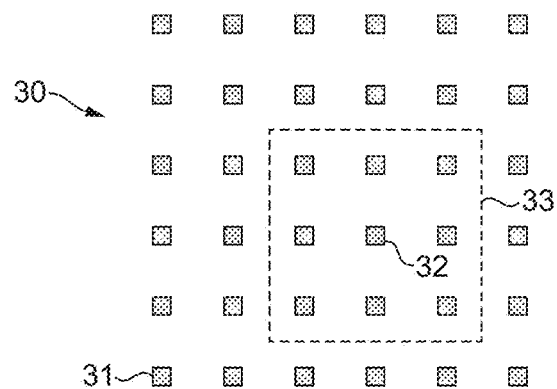
FIG. 3 illustrates an aspect of the embodiment of the motion estimation process of the technology described herein shown in FIG. 2.
Figure 4:
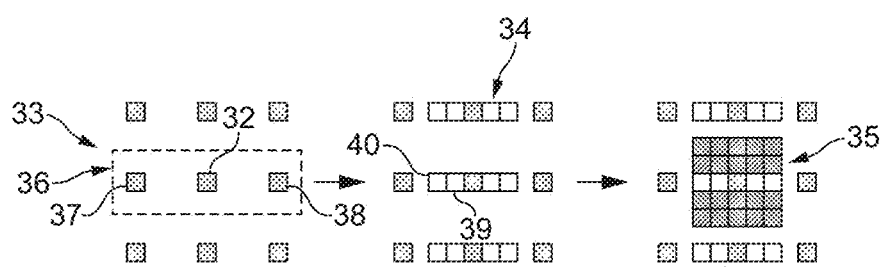
FIG. 4 illustrates an aspect of the embodiment of the motion estimation process of the technology described herein shown in FIG. 2.
Figure 5:
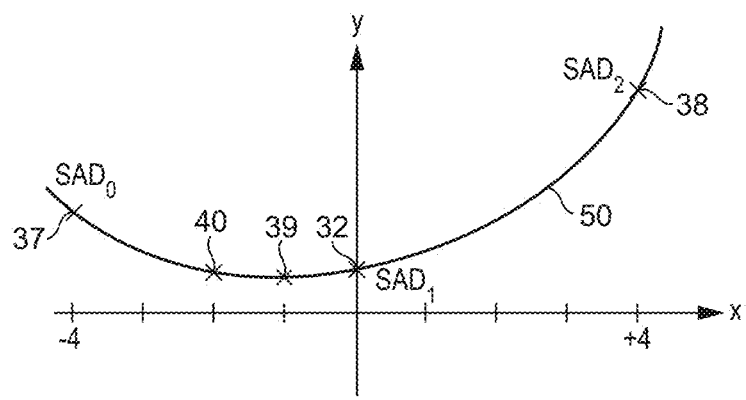
FIG. 5 illustrates an aspect of the embodiment of the motion estimation process of the technology described herein shown in FIG. 2.

FIGS. 2-5 show an embodiment of the motion estimation process of the technology described herein. FIG. 2 is a flowchart of the overall motion estimation process in the present embodiment, and FIGS. 3 to 5 illustrate aspects of that operation in more detail.

As shown in FIG. 2, once a video frame block to be encoded has been received (step 21), the motion estimation process starts by determining for a plurality of reference frame block positions at a first, coarser resolution, a difference (error) measure when comparing a block of the reference frame at the position in question to the frame block that is to be encoded (step 22).

In the present embodiment, this difference measure is determined as the sum of absolute differences (SAD) between the reference frame block having the position in question and the frame block being encoded (i.e. as the sum of the absolute differences between each pixel in the frame block to be encoded and the corresponding position in the reference frame block).

This is done for plural reference frame blocks, each having a different position in the reference frame. In the present embodiment, these initial sums of absolute difference values are determined for respective reference frame blocks that correspond to and are aligned with integer pixel positions in the reference frame.

FIG. 3 shows schematically the result of this process, namely an array of determined SAD values 30 for respective reference frame blocks at respective pixel positions 31. (In FIG. 3, each square represents a determined difference value (sum of absolute differences) for a reference frame block corresponding to that particular pixel position in the reference frame.)

Once a set of SAD values has been determined for plural reference frame blocks at different pixel positions, that set of SAD values 30 is then analysed to determine the reference frame block position having a minimum (the smallest encoding) "cost" value (measure), which is representative of the "cost" of using the reference frame block position as the reference frame block position when encoding the block being encoded.

In the present embodiment, the cost value (measure) for a given reference frame block position is based on the determined difference measure (e.g. SAD) for the block position, together with a parameter representing the cost of coding the motion vector that corresponds to the block position in question (in the video encoding scheme being used). In the present embodiment, the cost of coding the motion vector is represented as the number of bits that would be needed to encode the motion vector, weighted by a factor that represents the desired (selected) coding quality in terms of how much the residuals (differences) are to be quantised.

Thus, in the present embodiment, the cost value for a reference frame block position is determined as $$cost=SAD+lambda \times bits$$

where
SAD is the sum of absolute differences for the block position in question;
bits is the number of bits needed to code the motion vector corresponding to that block position (the cost of coding the motion vector); and
lambda is a constant weighting factor that depends on the encoding quality being used (how much the residuals are to be quantised).
Other arrangements would, of course, be possible.
In the present example, it is assumed that the reference frame block having position 32 shown in FIG. 3, has the minimum cost value.

That minimum cost value reference frame block position 32, together with its surrounding eight closest adjacent eight reference frame block positions, are then, as shown in FIG. 3, selected 33 for further motion estimation processing.

As shown in FIG. 2, the next stage in the processing is to use the SAD values for the selected reference frame block positions 33 to estimate SAD values for reference frame blocks at positions intermediate (in between) the selected positions 33 (step 23). In the present embodiment, this is done to estimate SAD values for reference frame block positions at quarter pixel positions lying between the reference frame block "integer pixel" positions 33 that were selected.

FIG. 4 illustrates this, and shows that SAD values are estimated for reference frame blocks at quarter pixel positions as shown in FIG. 4.

As shown in FIG. 4, this is done in two stages, firstly by estimating SAD values for reference frame blocks at quarter pixel positions 34 along the horizontal direction, and by then using those estimated SAD values (together, as appropriate, with the determined SAD values from step 22) to estimate SAD values for reference frame blocks at plural quarter pixel positions 35 along the vertical direction.

In order to estimate the SAD values at the intermediate, quarter pixel positions, a second degree polynomial is fitted to the three known integer pixel position SAD values spanning the intermediate pixel positions for which estimates are required, and that polynomial is then used to estimate the SAD values at the desired intermediate (quarter pixel) positions. (A second degree polynomial is used for the estimation process, as that only requires adjacent values in order to be able to fit the second degree polynomial, and a second degree polynomial will always produce a minimum SAD value if the centre value of the three SAD values that the polynomial is being fitted to is the smallest.)

Thus as shown in FIG. 4, three second degree polynomials are fitted in the horizontal direction to estimate SAD values for quarter pixel positions in the horizontal direction, and then five second degree polynomials are fitted in the vertical direction to estimate SAD values for quarter pixel positions in the vertical direction.

FIG. 5 shows an exemplary fitting of a second degree polynomial to the row of positions 36 in FIG. 4. The scale along the x axis is quarter pixel positions, and the y axis shows the SAD values. The determined SAD values at the integer pixel positions 36, 32, 38 are shown in FIG. 5, together with a second degree polynomial 50 that has been fitted to those values. As shown in FIG. 5, the fitted second degree polynomial 50 can then be used to derive an estimated SAD value for the quarter pixel positions intermediate the integer pixel positions (such as for the quarter pixel position 39 shown in FIG. 4).

Once the set of estimated intermediate (quarter pixel) position SAD values have been determined, those values are then used to derive corresponding cost values (as discussed above) for those block positions. The cost values are then analysed to identify the reference frame block position having the minimum (smallest) cost value. This will accordingly identify a reference frame block position having the minimum (smallest) cost value at a finer resolution (in this case at a quarter pixel resolution).

Once that minimal cost value position has been identified, three other reference frame block positions to be assessed further are also identified (step 24, FIG. 2) by taking the derivative of the second degree polynomial that was used to estimate the SAD values in the horizontal direction to determine which adjacent intermediate reference frame block position in the horizontal direction should be considered further, and, correspondingly, by taking the derivative of the second degree polynomial that was used to estimate the SAD values in the vertical direction to determine which adjacent intermediate reference frame block position should be considered in the vertical direction. This accordingly identifies a block of 2×2 pixel positions at the finer (in this case quarter pixel) resolution that are to be assessed further.

In the example shown in FIG. 5, the analysis of the estimated SAD values at the quarter pixel resolution along the x-axis direction would identify that the quarter pixel position 39 at "−1" along the x axis has the minimum SAD value, and that the other position along the x axis that should be considered is the quarter pixel position 40 at "−2" along the x axis (since the minimum of the SAD value polynomial is located between those positions along the x axis).

A corresponding process is performed for the vertical direction (not shown).

Once the set of 2×2 finer resolution positions to evaluate further has been determined in this way, then as shown in FIG. 2, "full" SAD values are determined for each of those reference frame block positions (step 25). This is again done by determining the sum of absolute differences between the frame block that is being encoded, and each reference frame block corresponding to a selected reference frame block position. In this case, and where necessary, as the reference frame blocks that are being considered may be aligned with non-integer pixel positions (e.g. quarter pixel positions), then the appropriate reference frame block data values to be used for the sum of absolute differences determination are interpolated from the known values at the actual pixel positions. In the present embodiment, bilinear interpolation is used for this, but other interpolation arrangements could be used if desired.

Once a "full" sum of absolute difference values has been determined for each of the selected finer resolution reference frame block positions, then those values are again used to derive corresponding cost values (as discussed above) for those block positions. The one of those reference frame block positions having the minimum (smallest) cost value is then selected as the reference frame block position to use when encoding the frame block in question (step 26). Accordingly, a motion vector corresponding to that reference frame block position is associated with and encoded for the frame block being encoded (step 27), together with a set of residual (difference) values for the frame block relative to the reference frame block having that determined position.

Figure 6:
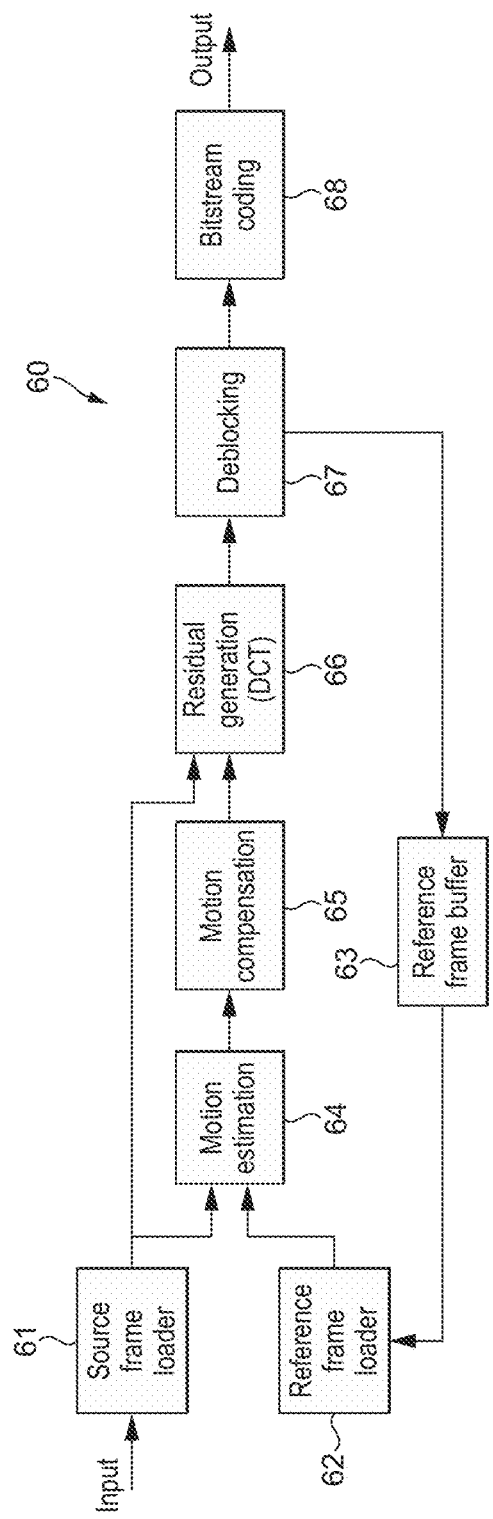
FIG. 6 shows schematically a video encoder that may operate according to embodiments of the technology described herein.

FIG. 6 shows schematically a video encoder and illustrates where the motion estimation operation of the present embodiment described above fits in to an overall video encoding process.

As shown in FIG. 6, the video encoder 60 includes a source frame loader 61 that receives input video image data for "source" frames to be encoded from an appropriate source of those frames, such as a video camera.

As well as the source frame loader 61, the video encoder 60 also includes a reference frame loader 62 that loads video image data of source frames that have previously been encoded from a reference frame buffer 63 to act as reference frames for the encoding of subsequent, new "source" frames received by the source frame loader 61.

As shown in FIG. 6, a new source video frame to be encoded and a reference video frame that the new source video frame is to be encoded with reference to are both provided to a motion estimation stage 64 of the video encoder 60.

The motion estimation stage 64 determines for each pixel block that the new source frame 61 has been divided into for encoding purposes, a corresponding block in the reference frame that should be used as the reference frame block when encoding the source frame block. This motion estimation stage 64 uses the motion estimation process discussed above with reference to FIGS. 2 to 5. The motion estimation stage 64 includes appropriate processing circuitry, such as programmable processing circuitry, for performing these operations.

Once the motion estimation process has identified the reference frame block to be used when encoding a block of a source frame to be encoded, that information is provided to a motion compensation stage 65 which applies motion compensation to the selected reference frame block to, e.g., allow for camera movement between the video frames.

The "motion-compensated", determined reference frame block is then provided, together with the original source frame block that is being encoded, to a "residual" (differences) generation stage 66. The residual generation stage 66 first determines a set of difference values representative of the difference between each pixel in the source frame block and the corresponding position in the (motion-compensated) reference frame block that has been generated by the motion compensation stage 65. The so-generated block of pixel difference values is then subjected to a transformation operation (in the present embodiment a discrete cosine transformation) to generate a set of coefficients representing the differences between the two blocks in the frequency domain. The so-transformed coefficients may also then be quantised.

The transformed, and, e.g., quantised, block residual information is then subjected to a "de-blocking" operation 67. This applies a "de-blocking" filter that operates to smooth the edges between the individual pixel blocks that the source frame being encoded has been divided into for encoding purposes, for example by sampling pixels on each side of two bordering pixel blocks and then determining therefrom an average colour for the edge pixels and re-colouring the edge pixels accordingly. This helps to create a smoother transition between respective pixel blocks that a source frame has been divided into for encoding purposes.

Following the de-blocking operation, the data representing the source frame is then coded for transmission as a bitstream, for example by using an appropriate entropy (variable length) coding scheme, such as Huffman coding, in a bit stream coding stage 68.

As well as the quantised residual data, any other information that is necessary to allow a decoder to reconstruct the encoded video data is also encoded into the bitstream, such as the values of any necessary encoding parameters, the motion vectors from the motion estimation process, etc. The bitstream representing the encoded source video frame can then be output, e.g., for transmission to a remote receiver and/or for storage.

As shown in FIG. 6, as well as providing the video data from the de-blocking stage 67 for bitstream encoding 68, video data is also sent to the reference frame buffer 63, so that it can be used by the reference frame loader 62 as reference frame data for encoding subsequent input source frames.

This process is then repeated for the next source video frame to be encoded, and so on.

Figure 7:
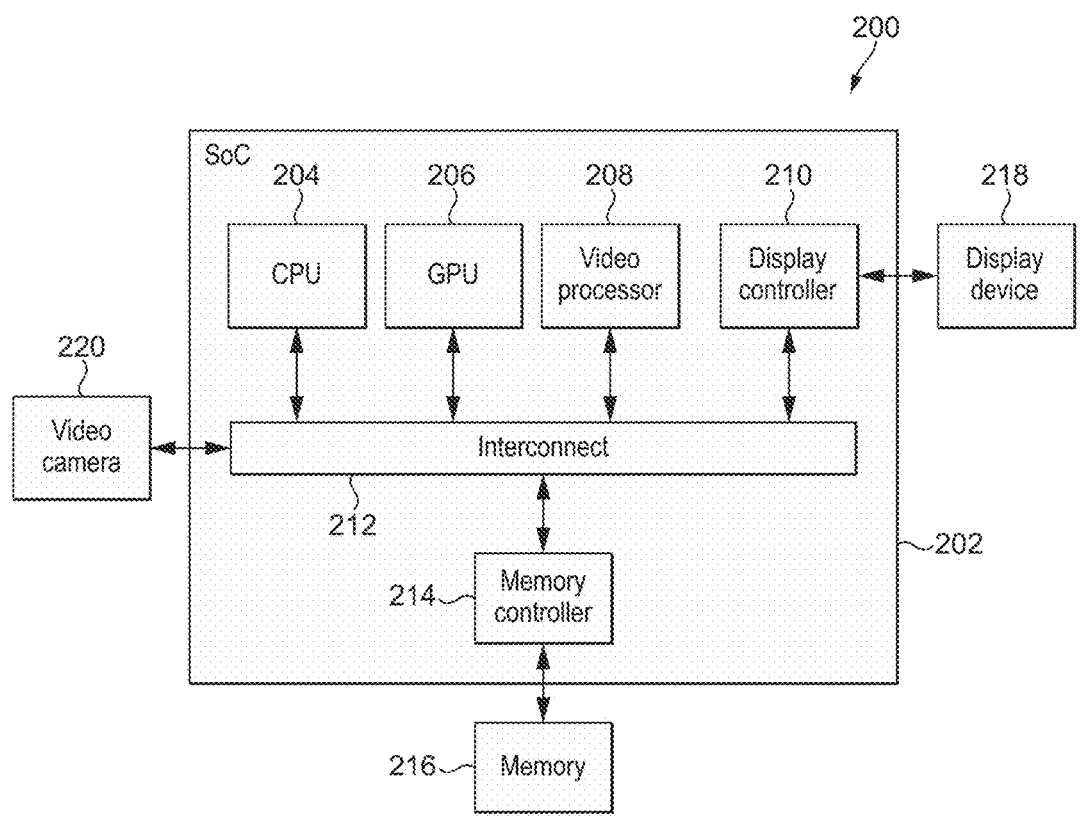
FIG. 7 shows schematically a data processing system that may operate according to embodiments of the technology described herein.

FIG. 7 shows an exemplary data processing system 200 that the technology described herein may be implemented in.

The data processing apparatus includes a source of video frames 220, such as a video camera, that is operable to generate sequences of video frames, and a data processing apparatus in the form of a system on chip (SoC) 202 that is operable to receive the video frames (data) from the source (camera) 220. The system 200 also comprises off-chip (main) memory 216 and a display device 218.

The SoC 202 comprises a central processing unit (CPU) 204, a graphics processing unit (GPU) 206, a video processor 208, a display controller 210, an interconnect 212 and a memory controller 214.

As is shown in FIG. 7, the CPU 204, GPU 206, video processor 208, and display controller 210 communicate with each other via the interconnect 212 and with the memory 216 via the interconnect 212 and memory controller 214. The display controller 210 also communicates with the display device 218.

The video processor 208 receives video frames from the camera 220 and encodes those frames in the manner discussed above, and then outputs the encoded video data, e.g. for storage in memory 216 or for streaming to another device.

The encoded video data can later be retrieved and decoded, e.g. by the video processor 208, or received and decoded by another device. The decoded video data can then be output, e.g. by the display controller 210 to the display device 218 or by another device, for display.

Although the technology described herein has been described above with particular reference to video encoding and the motion estimation process of such encoding, as will be appreciated by those skilled in the art, the technology described herein is applicable wherever it is necessary to, e.g., compare two-dimensional arrays of data, such as in, for example, two-dimensional pattern recognition processes.

It can be seen from the above that the technology described herein, in its embodiments at least, provides a more efficient mechanism for performing the motion estimation process in video encoding. In particular, the technology described herein, in its embodiments at least, is able to reduce the number of "full" sum of absolute difference values (difference measures) that need to be calculated for respective reference frame block positions when performing motion estimation, especially in cases where reference frame blocks having positions not corresponding to integer pixel positions are being considered.

The processing savings achieved by the technology described herein increase with increasing block size (and accordingly are of greater significance where video encoding processes use bigger block sizes). The Applicants have also found that at least for block sizes of 16×16 pixels and larger, the techniques of the technology described herein and of the present embodiments do not adversely affect the quality of the motion estimation process.

This is achieved, in the embodiments of the technology described herein at least, by determining sum of absolute difference values for reference block positions at a first, coarser resolution, but then using those determined sum of absolute difference values to estimate sum of absolute difference values for reference frame blocks at a second, finer resolution, and then using the estimated, finer resolution, sum of absolute difference values to identify a reduced set of reference frame block positions for which to determine "full" sum of absolute difference values.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of determining a motion vector for use when encoding a block of a frame of video data to be encoded, the method comprising:

for a block of a video frame being encoded:
for each of a plurality of different block positions in a reference video frame that the block being encoded is to be differentially encoded with respect to, the block positions being distributed at a first, coarser position resolution across the reference frame, determining a difference measure for the block being encoded with respect to a corresponding block of the reference frame having the block position in question;
using the determined difference measures at the first, coarser position resolution to estimate for each of a plurality of different block positions distributed across the reference frame at a second position resolution that is finer than the first, coarser resolution, a difference measure for the block being encoded with respect to a corresponding block of the reference frame having the block position in question;
using the estimated difference measures for the block positions at the second, finer resolution to select a set of at least one block position in the reference frame for which to determine a difference measure for the block being encoded;
for each position of the selected set of at least one block position, determining a difference measure for the block being encoded with respect to a corresponding block of the reference frame having the block position in question;
selecting the block position in the reference frame to use when encoding the block being encoded based on the determined difference measures for each block position of the selected set of at least one block position; and
determining a motion vector to use for the block being encoded based on the selected block position.

2. The method of claim 1, wherein the difference measure is the sum of absolute differences between the block being encoded and the reference frame block.

3. The method of claim 1, wherein the first, coarser resolution is at the resolution of one pixel.

4. The method of claim 1, wherein difference measures are only determined for block positions within a particular region of the reference frame at the first, coarser position resolution.

5. The method of claim 1, wherein the second, finer position resolution at which the difference measures are estimated is a sub-pixel resolution.

6. The method of claim 1, wherein the difference measures determined at the first, coarser position resolution are used to select a set of plural of those block positions at the first, coarser position resolution, and difference measure estimates are determined for reference frame block positions at the second, finer resolution that fall between the selected block positions at the first, coarser position resolution.

7. The method of claim 1, wherein the estimation is done by fitting a function to the determined difference measures for a set of plural block positions at the first, coarser resolution, and then using that function to generate an estimate for the difference measure for at least one reference frame block position at the second, finer resolution that is in between the set of plural block positions at the first, coarser resolution.

8. The method of claim 1, wherein the difference measures for the reference frame block positions at the second, finer resolution are estimated by fitting a second degree polynomial to plural reference block position difference measures at the first, coarser resolution.

9. The method of claim 1, wherein the selected set of at least one block position in the reference frame for which to determine a difference measure for the block being encoded comprises a block position in the reference frame having a smallest determined cost measure, which cost measure is based at least in part on the determined/estimated difference measure for the block position, together with at least one block position at the second, finer resolution, or at a resolution that is finer than the second resolution, that is adjacent to that block position having the smallest determined cost measure.

10. The method of claim 1, wherein a block position having a smallest determined cost measure, which cost measure is based at least in part on the determined/estimated difference measure for the block position, is selected as the block position in the reference frame to use when encoding the block being encoded.

11. An apparatus for determining a motion vector for use when encoding a block of a frame of video data to be encoded, the apparatus comprising:

difference measure determining circuitry configured to determine, for a block of a video frame being encoded, for each of a plurality of different block positions in a reference video frame that the block being encoded is to be differentially encoded with respect to, the block positions being distributed at a first, coarser position resolution across the reference frame, a difference measure for the block being encoded with respect to a corresponding block of the reference frame having the block position in question;
difference measure estimating circuitry configured to use the determined difference measures at the first, coarser position resolution to estimate for each of a plurality of different block positions distributed across the reference frame at a second position resolution that is finer than the first, coarser resolution, a difference measure for the block being encoded with respect to a corresponding block of the reference frame having the block position in question;
block position selection circuitry configured to use the estimated difference measures for the block positions at the second, finer resolution to identify a set of at least one block position in the reference frame for which to determine a difference measure for the block being encoded;
difference measure determining circuitry configured to determine, for each position of the selected set of at least one block position, a difference measure for the block being encoded with respect to a corresponding block of the reference frame having the block position in question;
selection circuitry configured to select the block position in the reference frame to use when encoding the block being encoded based on the determined difference measures for each block position of the selected set of at least one block position; and motion vector determining circuitry configured to determine a motion vector to use for the block being encoded based on the selected block position.

12. The apparatus of claim 11, wherein the difference measure is the sum of absolute differences between the block being encoded and the reference frame block.

13. The apparatus of claim 11, wherein the first, coarser resolution is at the resolution of one pixel.

14. The apparatus of claim 11, wherein the second, finer position resolution at which the difference measures are estimated is a sub-pixel resolution.

15. The apparatus of claim 11, wherein the difference measures determined at the first, coarser position resolution are used to select a set of plural of those block positions at the first, coarser position resolution, and difference measure estimates are determined for reference frame block positions at the second, finer resolution that fall between the selected block positions at the first, coarser position resolution.

16. The apparatus of claim 11, wherein the estimation is done by fitting a function to the determined difference measures for a set of plural block positions at the first, coarser resolution, and then using that function to generate an estimate for the difference measure for at least one reference frame block position at the second, finer resolution that is in between the set of plural block positions at the first, coarser resolution.

17. The apparatus of claim 11, wherein the difference measures for the reference frame block positions at the second, finer resolution are estimated by fitting a second degree polynomial to plural reference block position difference measures at the first, coarser resolution.

18. The apparatus of claim 11, wherein the selected set of at least one block position in the reference frame for which to determine a difference measure for the block being encoded comprises a block position in the reference frame having a smallest determined cost measure, which cost measure is based at least in part on the determined/estimated difference measure for the block position, together with at least one block position at the second, finer resolution, or at a resolution that is finer than the second resolution, that is adjacent to that block position having the smallest determined cost measure.

19. The apparatus of claim 11, wherein a block position having a smallest determined cost measure, which cost measure is based at least in part on the determined/estimated difference measure for the block position, is selected as the block position in the reference frame to use when encoding the block being encoded.

20. A non-transitory computer readable storage medium storing computer software code which when executing on a processor performs a method of determining a motion vector for use when encoding a block of a frame of video data to be encoded, the method comprising:

for a block of a video frame being encoded:

for each of a plurality of different block positions in a reference video frame that the block being encoded is to be differentially encoded with respect to, the block positions being distributed at a first, coarser position resolution across the reference frame, determining a difference measure for the block being encoded with respect to a corresponding block of the reference frame having the block position in question;

using the determined difference measures at the first, coarser position resolution to estimate for each of a plurality of different block positions distributed across the reference frame at a second position resolution that is finer than the first, coarser resolution, a difference measure for the block being encoded with respect to a corresponding block of the reference frame having the block position in question;

using the estimated difference measures for the block positions at the second, finer resolution to select a set of at least one block position in the reference frame for which to determine a difference measure for the block being encoded;

for each position of the selected set of at least one block position, determining a difference measure for the block being encoded with respect to a corresponding block of the reference frame having the block position in question;

selecting the block position in the reference frame to use when encoding the block being encoded based on the determined difference measures for each block position of the selected set of at least one block position; and determining a motion vector to use for the block being encoded based on the selected block position.

\* \* \* \* \*